United States Patent Office 3,510,709
Patented May 5, 1970

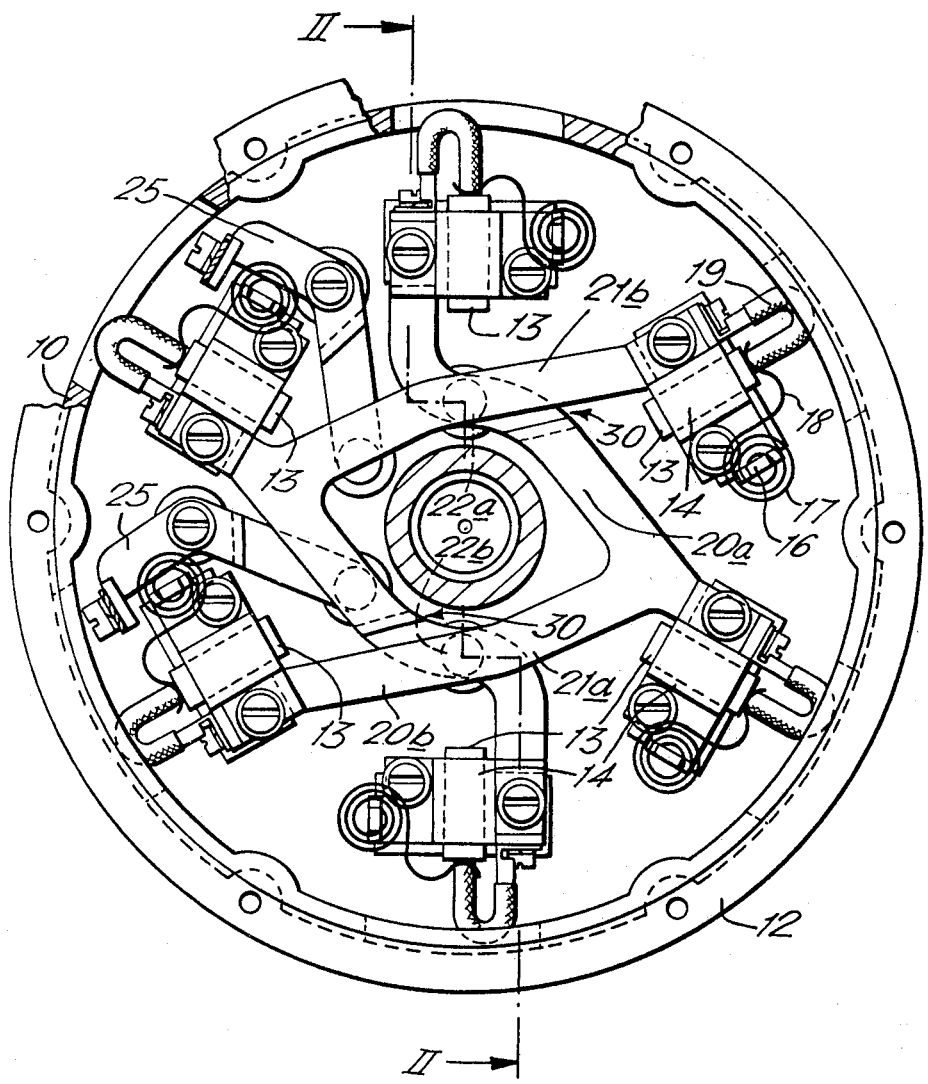

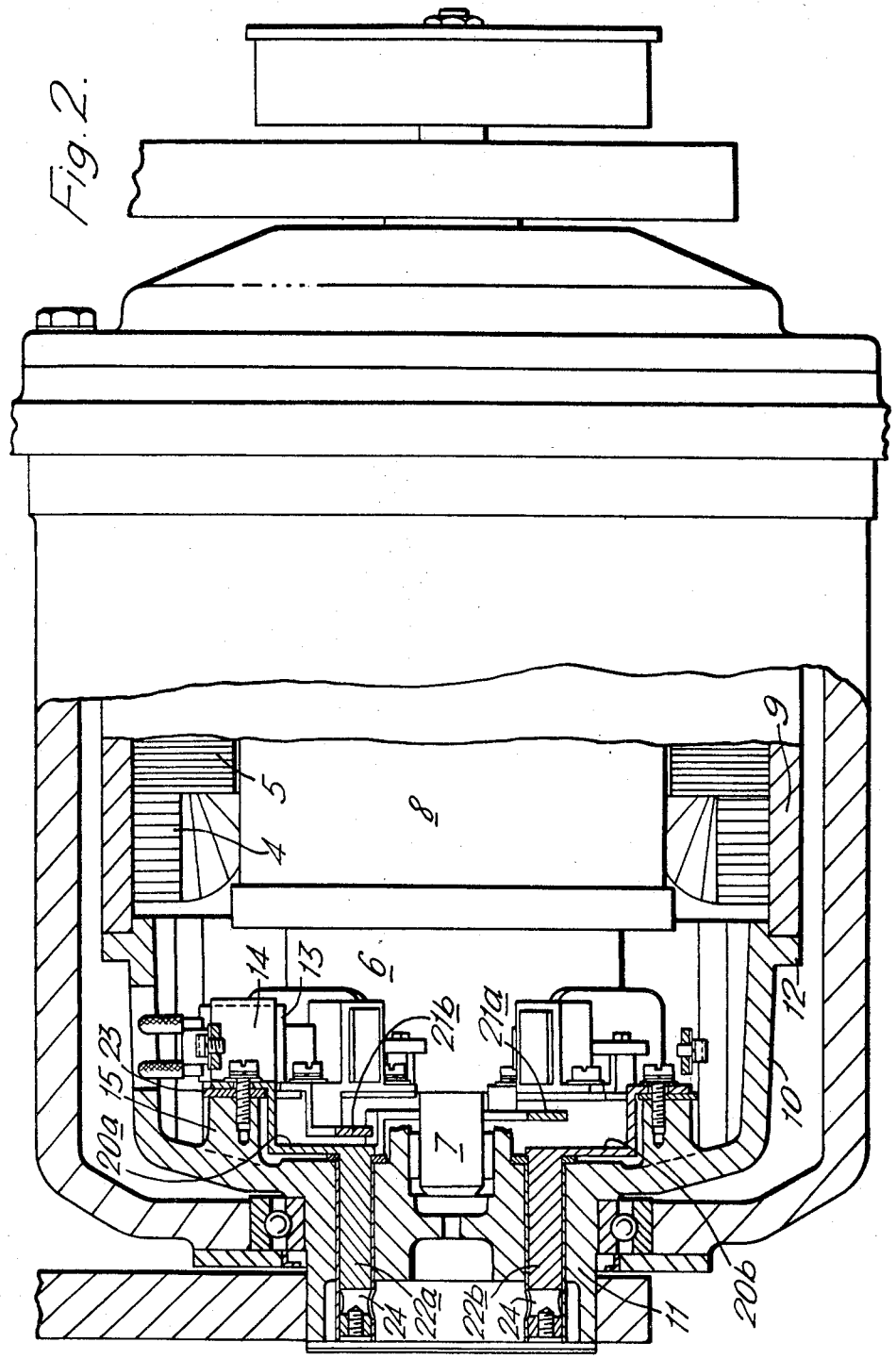

3,510,709
DYNAMOELECTRIC MACHINES
John L. Walker, Twickenham, and William Henry
Moore, Wembley, England, assignors to C.A.V.
Limited, London, England, a British company
Filed July 23, 1968, Ser. No. 746,875
Claims priority, application Great Britain, Aug. 3, 1967,
35,749/67
Int. Cl. H01r 39/38
U.S. Cl. 310—239                                    2 Claims

ABSTRACT OF THE DISCLOSURE

A dynamoelectric machine including a commutator and a plurality of brushes for cooperation with the periphery of the commutator and through which electric current flows to and from the armature windings of the machine. At least a pair of such brushes are electrically inter-connected and this interconnection is achieved by connecting links which are formed integrally with the brush boxes supporting the brushes. Conveniently the brush boxes and connecting links are formed as a cast structure.

---

This invention relates to dynamoelectric machines of the kind having a commutator and a plurality of brushes bearing thereon and through which electric current flows to and from the armature windings of the machine, at least a pair of such brushes being electrically interconnected.

In the past it has been the practice to mount the brush boxes in which the brushes are slidably mounted respectively, upon an end closure plate of the machine and to provide the necessary interconnection between the brush boxes by means of electrical conductors which are secured to the brush boxes after mounting In some cases one pair of brush boxes are interconnected through the end closure plate. Whichever method of interconnection is used however, joints occur which may have a substantial electrical resistance sufficient to cause electric unbalance when heavy currents are flowing in the armature windings. Moreover, the assembly of the complete end closure plate is not easy.

The object of the present invention is to provide a dynamoelectric machine of the kind specified in an improved form.

According to the invention in a dynamoelectric machine of the kind specified, the interconnected brush boxes are formed together with the interconnecting link, as a cast structure.

According to a further feature of the invention the cast structure is provided with a terminal post for connection to an electric cable external of the machine.

One example of a dynamoelectric machine in accordance with the invention will now be described with reference to the accompanying drawings in which:

FIG. 1 is an end view of the end closure cap of one example of a dynamoelectric machine in accordance with the invention, and FIG. 2 is a section on the line 2—2 of FIG. 1 of the whole machine with some parts shown in outline only.

As shown in the drawings the end closure cap comprises a cylindrical cup-shaped body 10 having an integral cylindrical spigot 11 formed on the external surface of its base wall. The open end of the body 10 is provided with an outwardly extending flange 12 having apertures formed therein and through which in use, extend bolts whereby the cap can be secured to the casing 9 of the machine. The casing of the machine accommodates an armature 8 one end of the supporting shaft 7 of which is rotatably mounted within a bore defined in the spigot 11. Furthermore, the armature is provided with a commutator 6 to which the windings of the armature are connected and mounted within the casing 9 is a field structure 5 which surrounds the armature and which incorporates windings 4.

The particular dynamoelectric machine is provided with six equiangularly spaced brushes 13 which cooperates with the periphery of the commutator 6 to carry current to and from the windings of the armature. Alternate brushes are electrically interconnected and the two sets of brushes so defined are connected in use, to the terminals of a source of D.C. supply.

Each brush is slidably mounted within a brush box 14 secured by means of a pair of screws to an upstanding boss 15 formed integrally with the cup-shaped body 10. Moreover, each brush box is provided with a spring post 16 upon which is mounted a helically coiled spring 17 having a free arm 18 which acts to urge the brush into contact with the commutator. Furthermore, each brush is provided with a flexible conductor 19 which at its free end is connected to the associated brush box.

As is shown in the drawings and in accordance with the invention the brush boxes associated with the two sets of brushes together with their electrical interconnectors are formed as cast structures the design being such that the two structures are identical.

Considering one of the structures the interconnectors are referenced 20a and 21a and the corresponding interconnectors of the other structure are referenced 20b and 21b. It will be seen that the interconnectors 20a and 20b are cranked at 30 so as to permit the crossing thereof of the interconnectors 21b and 21a respectively. Moreover, adjacent the cross-over points the interconnectors 20a and 20b are provided with terminal posts 22a and 22b respectively. The terminal posts extend through bores respectively formed in the spigot 11, electrically insulating sleeves being provided to afford electrical insulation. Furthermore, each brush box is electrically insulated from the associated boss 15 by means of an insulating plate 23 and the screws which serve to secure the brush boxes upon the boss 15 are also insulated by sleeves where they pass through the metal portion of the brush box.

The terminal posts 22a and 22b extend into a cavity which is defined within the spigot 11 and the protruding portions of the terminal posts are provided with apertures 24 whereby cables may be connected thereto.

Separately formed from the aforesaid structures are a pair of field winding connectors 25 these also being provided with terminal posts which extend into the cavity defined in the spigot and at their other ends, with attachment means whereby the ends of the field winding 4 may be secured thereto during assembly of the machine.

The aforesaid structures are formed as die castings from brass thereby eliminating the electrical connections between the brush boxes. Furthermore, the assembly of the structures within the end cover is very easy and if desired, the brushes can be assembled to their holders respectively prior to the assembly of the connection within the cover.

Having thus described our invention what we claim as new and desire to secure by Letters Patent is:

1. A dynamoelectric machine of the kind comprising a stator structure, an armature rotatably mounted within the stator structure, a commutator mounted on the armature, six brushes bearing upon the commutator at spaced positions, means electrically interconnecting alternate brushes, the two sets of brushes thus formed serving to convey electric current to and from the armature, an open ended metal brush box associated with each brush, each brush being slidably mounted within its asociated brush box, the means electrically interconnecting the brushes of each of said sets of brushes comprising a pair of interconnecting links which are cast integrally with respective brush boxes.

2. A dynamoelectric machine as claimed in claim 1 including a pair of terminal posts for connection to a pair of electric cables external of the machine the terminal posts being cast integrally with one of the interconnecting links associated with the sets of brushes respectively.

References Cited

UNITED STATES PATENTS

| | | | |
|---|---|---|---|
| 1,164,263 | 12/1915 | Creveling | 310—230 |
| 1,990,767 | 2/1935 | Whitsitt et al. | 310—230 |
| 2,209,361 | 7/1940 | Sutherland | 310—239 |
| 2,236,707 | 4/1941 | Darner et al. | 310—239 |
| 2,753,477 | 8/1953 | Yahn et al. | 310—239 |
| 3,141,985 | 5/1961 | Martin | 310—239 |

MILTON O. HIRSHFIELD, Primary Examiner

L. L. SMITH, Assistant Examiner